Aug. 17, 1926.
M. DE GROOTE
1,596,585
PROCESS FOR BREAKING WATER IN OIL EMULSIONS
Filed Dec. 23, 1924
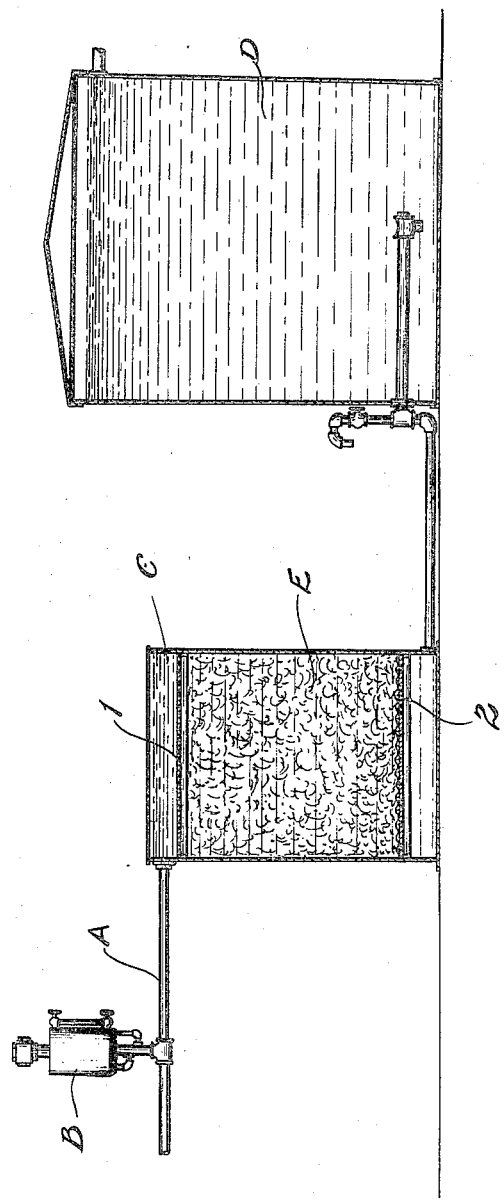
INVENTOR
MELVIN DE GROOTE
BY Bakewell & Church
ATTORNEY Patented Aug. 17, 1926.

1,596,585

UNITED STATES PATENT OFFICE.

MELVIN DE GROOTE, OF ST. LOUIS, MISSOURI, ASSIGNOR TO WM. S. BARNICKEL & COMPANY, OF WEBSTER GROVES, MISSOURI, A CORPORATION OF MISSOURI.

PROCESS FOR BREAKING WATER IN OIL EMULSIONS.

Application filed December 23, 1924. Serial No. 757,734.

This invention relates to the treatment of emulsions of mineral oil and water, such as petroleum emulsions, for the purpose of separating the oil from the water.

Petroleum emulsions of the kind referred to are commonly known as "cut oil", "roily oil" and "bottom settlings", and consist of oil constituting the continuous phase of the emulsion, droplets of water distributed throughout the body of oil and constituting the dispersed phase, and films of matter that encase the droplets of water.

Various processes have been devised for breaking such emulsions, most of which prior processes contemplate adding to or mixing with a petroleum emulsion a relatively small quantity of a chemical treating agent or demulsifying agent that will act on the emulsion in such a manner that the water of the emulsion will separate from the oil when the emulsion is allowed to remain in a quiescent state at a suitable temperature, after treatment. In some of the said prior processes attempts have been made to obtain a thorough distribution of the treating agent by passing the emulsion, after the treating agent has been added, through a mass of excelsior or similar neutral material, but from my experience in handling petroleum emulsions, I am led to believe that the efficiency of a process for breaking a petroleum emulsion by means of a treating agent or demulsifying agent is not dependent upon a thorough distribution of the treating agent through one or both phases of the emulsion, but is dependent upon another factor, to wit, the segregation of a relatively large amount of treating agent on the emulsifying films surrounding the droplets of water.

To this end I have devised a process for breaking water in oil emulsions which is distinguished from prior treating processes, in that it contemplates subjecting the emulsion to the action of a means which effects the adsorption of a relatively great quantity of a suitable treating agent or demulsifying agent on practically the entire area of substantially all of the emulsifying films surrounding the droplets of water. This can be accomplished either by moving the emulsion past a zone formed of a solid material or substance having a certain property or properties, hereinafter described, and containing a suitable treating agent distributed over a relatively great area of said zone, or it can be accomplished by keeping such a material in finely-divided form, in motion in a mass of emulsion with which a suitable treating agent is mixed. In either case the material on which the treating agent is concentrated is engaged by or with the emulsifying films of the emulsion in such a way as to cause the treating agent to be adsorbed on practically the entire area of substantially all of the emulsifying films. My broad idea is applicable to any process for breaking petroleum emulsions that contemplates subjecting the emulsion to the action of a demulsifying agent or treating agent, and it is an improvement on a process which merely contemplates the distribution of a treating agent more or less uniformly throughout either one or both phases of the emulsion, in that the treating agent is so effectively controlled that substantially all of the treating agent is used, and moreover, is adsorbed on practically the entire area of substantially all of the emulsifying films.

The substance or material employed to attain the above result must be capable of holding a petroleum emulsion treating agent on its surface or surfaces when said material is immersed in oil, so as to present said treating agent to the films surrounding the droplets of water during the operation of forming contact between said films and treating agent. I prefer to use a solid material or substance, which, in addition to having the property just mentioned, is of such a character that when immersed in oil it is capable of drawing the treating agent to its surface or surfaces. One material having the above mentioned properties or characteristics which I have found to be highly satisfactory is shavings of commercially pure zinc, and another satisfactory material is shavings of chemically pure iron. I believe the reason why such materials are suitable for use in my process is that the resulting interfacial tension, produced by the contact of the oil of the emulsion on said material, causes the treating agent in the emulsion to be drawn to said material and held thereon by adsorption.

In practicing my process I prefer to form a zone from a material that has both of the above-mentioned properties and add the treating agent to the emulsion before the emulsion is moved past said zone. When the emulsion engages said zone, the treating agent in the emulsion will be concentrated on the surface or surfaces of said zone, and thus be held in such a position that it will effectively act on the emulsifying films that encase the droplets of water, as the emulsion travels past said zone, the replenishing of the treating agent to said zone being effected automatically, due, of course, to the ability of the material from which the zone is constructed to draw the treating agent to its surface and hold it thereon. While I prefer to add the treating agent to the emulsion and then move the emulsion past a zone that has both of the characteristics above described, my broad idea is applicable to a process in which the treating agent is added to a zone formed of a solid material that is merely capable of maintaining the treating agent on its surface, and the emulsion thereafter brought to said zone so as to cause the emulsifying films surrounding the droplets of water to come into direct contact with the treating agent. It is also applicable to a process in which a substance or material of the kind mentioned, in finely divided form, is kept in motion in a mass of emulsion to which a treating agent has been added. While I have specified commercially pure zinc shavings and chemically pure iron shavings as being suitable materials for use in my process, I wish it to be understood that other materials may be used without departing from the spirit of my invention. In instances where it is sought to use materials other than those mentioned the fact whether the contemplated materials have the required qualifications, properties or characteristics can be easily determined by anyone skilled in this art, as, for example, by the following test: A blank test is first run in which a Jones reductor tube is used to hold an inert material through which a selected cut oil or other emulsion, together with the usual amount of treating agent, is passed, the depth of the inert material in the tube being approximately eight inches. By this means the maximum ratio obtainable by ideal mixing is determined. This ratio between treating agent and emulsion is then increased a significant amount, say, for instance, from 10% to 100%, and thereafter tests, identical with the blank test, are made with other Jones reductor tubes, containing different materials to be tested, the emulsion being passed drop-wise through the material in the tubes, preferably, at a temperature of 150° F. For obvious reasons it is desirable to use several different emulsions and a variety of treating agents in determining the value of the material under consideration and sufficient tests should be made to prove conclusively whether or not a selected material has the required qualifications, which fact is shown by the amount of treating agent required to produce an efficient "break" with the selected material in comparison with the amount of treating agent required to produce an efficient "break" with the inert material.

The shape or form of the material that is used to produce the treating zone is immaterial, but it is desirable for economical reasons to use material exposing the greatest area per unit of weight. I have found that a highly efficient treating zone can be produced from a mass of small zinc shavings of a suitable size, arranged in a closed chamber provided with an inlet through which the emulsion is admitted and provided with an outlet through which the emulsion escapes after passing the zone, the particles of zinc forming in effect a baffling means having numerous surfaces of relatively great area on which the treating agent will be held, as previously described, when the emulsion passes through said baffling means.

In some instances it may be desirable to subject the emulsion to such action as to produce fissures in the emulsifying films or increase the size of existing fissures, as described in my companion application Serial No. 757,735, filed Dec. 23, 1924, prior to, subsequent to or simultaneously with the operation of causing the treating agent to be adsorbed on the emulsifying films, as above described. This can be effected by passing the emulsion through or over a layer of sand or other suitable non-absorbent, granular material capable of being wetted by the oil in the emulsion and containing voids approaching capillary dimensions, either before or after the emulsion is moved past the zone that causes the treating agent to be adsorbed on the films that encase the droplets of water, or it can be effected simultaneously with the operation of causing the treating agent to be adsorbed on the emulsifying films, by constructing the treating zone from granular commercially pure zinc or chemically pure iron whose particles have spaces between them approaching capillary proportions. In passing through a layer of sand or the like, or in passing through a zone constructed of particles of material that are separated by spaces approaching capillary proportions, the oil in the emulsion spreads out upon coming in contact with the particles constituting said layer or zone, thereby exerting a tension force on the droplets of water which tends either to create fissures in the films encasing said droplets or to enlarge any fissures that may exist in said films. It is immaterial, so far as my broad idea is concerned, whether or not the emulsion is subjected to this additional treatment, but such treatment is advantageous, in that it insures openings in the emulsifying films through which the treating agent can act so as to loosen the water, and thus cause coalescence.

For the purpose of clarity the term "non-absorbent" is herein used in the following sense: If a non-absorbent substance is subjected to the liquids, oil and water, for a period of time and subsequently wiped dry, it is still 100% original material by weight. There is no oil or water on its inner surfaces. If an absorbent material is subjected to the same procedure and wiped dry, it will contain some oil or water on its inner surfaces, and therefore, is no longer 100% original material by weight.

The figure of the drawings is a sectional view, illustrating an apparatus that can be used to practice my process.

Said apparatus comprises a conduit A through which the emulsion to be treated flows, a device B that is used for introducing a suitable treating agent into the conduit A, a chamber C through which the emulsion thereafter passes before entering the settling tank D, wherein it remains in a quiescent state to effect the separation of the water from the oil, and a treating zone E in the chamber C composed of material which is of such a character that the treating agent in the emulsion will be concentrated thereon and maintained in such a position that it will be directly engaged by the emulsifying films in which the droplets of water are encased. The chamber C is preferably provided with a false top and bottom 1 and 2, respectively, each consisting of a perforated member, and it contains, say, from six inches to thirty inches of commercially pure zinc, chemically pure iron, or other suitable material, in granular form, whose particles are of such size that a reasonable pump pressure will move the emulsion through the zone E, the rate of flow of the emulsion through said zone being determined by the tenacity of the emulsion, its viscosity and other characteristics.

When the emulsion passes through the zone E the treating agent in the emulsion will become adsorbed on the particles of material constituting said zone, due to the characteristics of said material, previously mentioned, and when the emulsifying films surrounding the droplets of water come in direct contact with said treating agent, said treating agent will become adsorbed on practically the entire area of substantially all of the emulsifying films. If the particles of material constituting the zone E are of a size similar to particles of sand, fissures will be formed in the emulsifying films or existing fissures in said films will be enlarged when the emulsion passes through the zone E. In effect such a process is the same as would be obtained if the emulsion were passed through a zone composed wholly of a treating agent, because the particles of non-absorbent material that constitute the zone E soon become coated with treating agent that will readily adsorb on the emulsifying films surrounding the droplets of water. As the particles of non-absorbent material that constitute the zone E are stationary, and are separated from each other by voids approaching capillary proportions, they virtually constitute a baffle against which the emulsifying films are forced with sufficient pressure to insure the transfer of the treating agent from the baffle onto the emulsifying films. The treating agent that is removed from said baffle by the contact of the emulsifying films with same is immediately replaced by other treating agent, which is drawn to said baffle, due to the peculiar properties of the material from which it is constructed, and consequently, the supply of the treating agent to the zone E, or the replenishing of said zone with treating agent will be effected automatically. While I prefer to mix the treating agent with the emulsion before the emulsion reaches the zone E, this is not essential to the successful operation of my process, for if desired, the treating agent can be conducted directly to the treating zone E from a source of supply, either intermittently, or continuously, at such a rate as to insure said zone always containing enough treating agent to cause said treating agent to be deposited on substantially the entire area of practically all of the emulsifying films of the emulsion.

The process above described is not limited to use with any particular kind of treating agent, and while I prefer to practice the process by passing the emulsion through a zone composed of small particles of material having the properties previously mentioned, my broad idea is applicable to a process in which the emulsion is moved over such a zone, and it is also applicable to a process in which a material having the characteristics mentioned, in finely-divided form, is kept in motion in a mass of emulsion with which a suitable treating agent is mixed.

Having thus described my invention, what I claim as new and desire to secure by Letters Patent, is:—

1. A process for breaking water in oil emulsions, characterized by establishing contact between the emulsion and particles of a solid non-absorbent material on which a demulsifying agent is held by adsorption.

2. A process for breaking water in oil emulsions, characterized by producing relative movement of the emulsion, and particles of solid, non-absorbent material on which a suitable demulsifying agent is held by adsorption.

3. A process for breaking water in oil emulsions, characterized by causing small particles of a solid non-absorbent material to become coated with a suitable demulsifying agent which is held on said particles by adsorption, and thereafter causing contact between said coated particles and the emulsion.

4. A process for breaking water in oil emulsions, characterized by moving such an emulsion past a zone on which a demulsifying agent is held by adsorption in a position where it will come in direct contact with the emulsion.

5. A process for breaking water in oil emulsions, characterized by bringing such an emulsion into engagement with a baffle on which a demulsifying agent is held by adsorption and which is of such construction that it causes the emulsion to come in direct contact with the demulsifying agent.

6. A process for breaking water-in-oil emulsions, characterized by moving an emulsion with which a demulsifying agent is mixed through a zone composed of non-absorbent, solid particles, which, when wetted by the oil of the emulsion, will cause the demulsifying agent in the emulsion to be concentrated on said zone and thus brought into direct contact with the emulsion subsequently passed through said zone.

7. A process for breaking water-in-oil emulsions, characterized by moving an emulsion to which a demulsifying agent has been added through a zone that contains voids approaching capillary proportions and formed of a solid, non-absorbent substance which will cause the demulsifying agent to be concentrated on said zone by adsorption and thereafter contacted with the emulsion subsequently passed through said zone.

8. A process for breaking water in oil emulsions, characterized by establishing contact between the emulsion and particles of commercially pure zinc on which a demulsifying agent is held.

9. A process for breaking water in oil emulsions, characterized by moving such an emulsion past a zone formed of particles of commercially pure zinc on which a demulsifying agent is held in a position where it will come in direct contact with the emulsion.

MELVIN DE GROOTE